(12) United States Patent
Jia et al.

(10) Patent No.: US 10,230,782 B2
(45) Date of Patent: Mar. 12, 2019

(54) UNBALANCED MAPPING BETWEEN DESKTOP AND MOBILE PAGES

(71) Applicant: Microsoft Technology Licensing, LLC, Redmond, WA (US)

(72) Inventors: Yubo Jia, Bellevue, WA (US); Sujata Suresh Adgaonkar, Redmond, WA (US); David Chan, Sammamish, WA (US); Ajey Pankaj Shah, Bellevue, WA (US); Frederico A. Mameri, New York, NY (US); Alin Sirbu, Seattle, WA (US); Elias David Block, Bellevue, WA (US); Alexandru Dan Burst, Kirkland, WA (US); Kristofer D. Hoffman, Sammamish, WA (US); John Lincoln DeMaris, Seattle, WA (US); Kathryn Bergina Dramstad, Seattle, WA (US); Dwayne Wensley Ricardo Codrington, Newcastle, WA (US); Alexandra Leewon Schultz, Cambridge, MA (US); Onur Dagci, Bellevue, WA (US); Michael Brandon Silverstein, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 14/542,860

(22) Filed: Nov. 17, 2014

(65) Prior Publication Data

US 2015/0142890 A1   May 21, 2015

Related U.S. Application Data

(60) Provisional application No. 61/905,500, filed on Nov. 18, 2013.

(51) Int. Cl.
*G06F 17/30* (2006.01)
*H04L 29/08* (2006.01)

(52) U.S. Cl.
CPC ........ *H04L 67/02* (2013.01); *G06F 17/30905* (2013.01); *H04L 67/30* (2013.01)

(58) Field of Classification Search
USPC ....................................................... 709/204
See application file for complete search history.

(56) References Cited

U.S. PATENT DOCUMENTS 6,272,545 B1 * 8/2001 Flanagin ................... G06F 8/61
709/201
7,111,231 B1    9/2006 Huck et al.
(Continued)

FOREIGN PATENT DOCUMENTS

CN      1979476 A     6/2007
WO    2009012461     1/2009
(Continued)

OTHER PUBLICATIONS

"Second Written Opinion Issued in PCT Application No. PCT/US2014/066048", dated Oct. 27, 2015, 5 Pages.
"International Preliminary Report on Patentability Issued in PCT Application No. PCT/US2014/066048", dated Jan. 25, 2016, 6 Pages.
"International Search Report and Written Opinion Issued in PCT Patent Application No. PCT/US2014/066048", dated Mar. 11, 2015, 11 Pages.
(Continued)

*Primary Examiner* — Umar Cheema
*Assistant Examiner* — John Fan

(57) ABSTRACT

A collaboration service is disclosed that hosts various collaboration sites. Each of the sites includes desktop pages and mobile pages. A routing service redirects mobile requests for the desktop pages to the mobile pages in accordance with a
(Continued)

desktop-to-mobile mapping that defines an unbalanced correspondence between the desktop pages and the mobile pages. The routing service also redirects desktop requests for the mobile pages to the desktop pages in accordance with a mobile-to-desktop mapping that defines a balanced correspondence between them desktop pages and the mobile pages.

20 Claims, 7 Drawing Sheets

(56) References Cited

U.S. PATENT DOCUMENTS

| | | | |
|---|---|---|---|
| 7,823,083 | B2 | 10/2010 | Rohrabaugh et al. |
| 8,181,106 | B2 | 5/2012 | Andeen et al. |
| 8,375,358 | B2 | 2/2013 | Baldwin et al. |
| 8,386,959 | B2 | 2/2013 | Rohrabaugh et al. |
| 2003/0009563 | A1 | 1/2003 | Douglis et al. |
| 2005/0097008 | A1 | 5/2005 | Ehring et al. |
| 2008/0172372 | A1* | 7/2008 | Shacham ............ G06F 17/3089 |
| 2008/0172373 | A1* | 7/2008 | Jenson ............... G06F 17/30876 |
| 2009/0006338 | A1 | 1/2009 | Ives et al. |
| 2010/0241948 | A1 | 9/2010 | Andeen et al. |
| 2012/0013622 | A1 | 1/2012 | Mahajan et al. |
| 2012/0079427 | A1* | 3/2012 | Carmichael ......... G06F 3/04817 715/825 |
| 2012/0208592 | A1* | 8/2012 | Davis .................... H04W 4/001 455/556.1 |
| 2012/0284012 | A1* | 11/2012 | Rodriguez ............. G06Q 30/06 704/1 |
| 2013/0113833 | A1 | 5/2013 | Larsson |
| 2013/0144928 | A1 | 6/2013 | Gittelman et al. |
| 2013/0226994 | A1 | 8/2013 | D'Aurelio et al. |
| 2013/0246944 | A1 | 9/2013 | Pandiyan et al. |
| 2014/0282139 | A1 | 9/2014 | Balogh et al. |
| 2015/0143227 | A1 | 5/2015 | Jia et al. |
| 2015/0178258 | A1 | 6/2015 | Meschkat et al. |

FOREIGN PATENT DOCUMENTS

| | | |
|---|---|---|
| WO | 2009012461 A1 | 1/2009 |
| WO | 2011139980 A1 | 11/2011 |

OTHER PUBLICATIONS

"Recommendations for Building Smartphone-Optimized Websites", Published on: Jun. 6, 2012, Available at: http://googlewebmastercentral.blogspot.in/2012/06/recommendations-for-building-smartphone.html.

"Running Desktop and Mobile Versions of Your Site", Published on: Nov. 18, 2009, Available at: http://googlewebmastercentral.blogspot.in/2009/11/running-desktop-and-mobile-versions-of.html.

"Developing Modern Mobile Web Apps", Published on: Jun. 2012, Availabe at: http://download.microsoft.com/download/O/F/B/0FBFAA46-2BFD-478F-8E56-7BF3C672DF9D/Developing%20Modern%20Mobile%20Web%20Apps.pdf "Device and Feature Detection on the Mobile Web", Published on: Jul. 4, 2010, Availabe at: http://developer.nokia.com/Community/Wiki/Device_and_feature_detection_on_the_mobile_web.

German, Bob, "Future Proof Solutions Part 1—Developing SharePoint Solutions that become SharePoint Hosted Apps", Published Oct. 5, 2013, Retrieved at: http://blogs/msdn/com/b/bobgerman/archive/2013/10/05/future-proof-solutions-part-1-take-a-walk-on-the-client-side.aspx; retrieved from the Internet, Feb. 20, 2015; 8 pages.

German, Bob, "Future Proof Solutions Part 2—Developing SharePoint Solutions that become Provider Hosted Apps", Published Oct. 8, 2013, Retrieved at: http://blogs/msdn/com/b/bobgerman/archive/2013/10/082future-proof-solutions-part-2-sharepoint-2010-solutions-that-become-provider-hosted-apps.aspx; retrieved from the Internet, Feb. 20, 2015; 10 pages.

Tatsubori, et al. "HTML Templates That Fly: A Template Engine Approach to Automated Offloading From Server to Client", International World Wide Web Conference Committee; Madrid, Spain; Apr. 20-24, 2009, pp. 951-960.

"First Office Action and Search Report Issued in Chinese Patent Application No. 201480062987.8", dated Sep. 5, 2018, 11 Pages.

\* cited by examiner

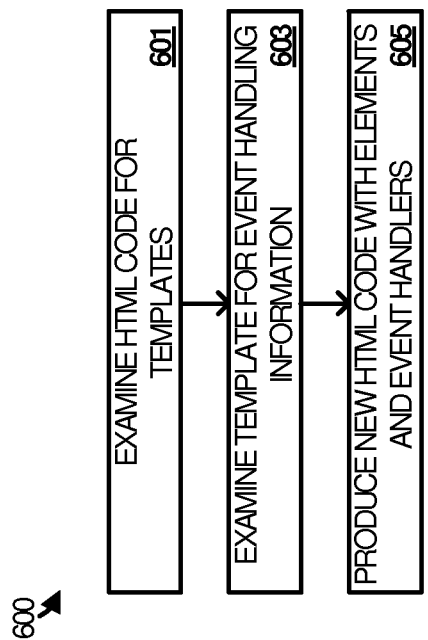
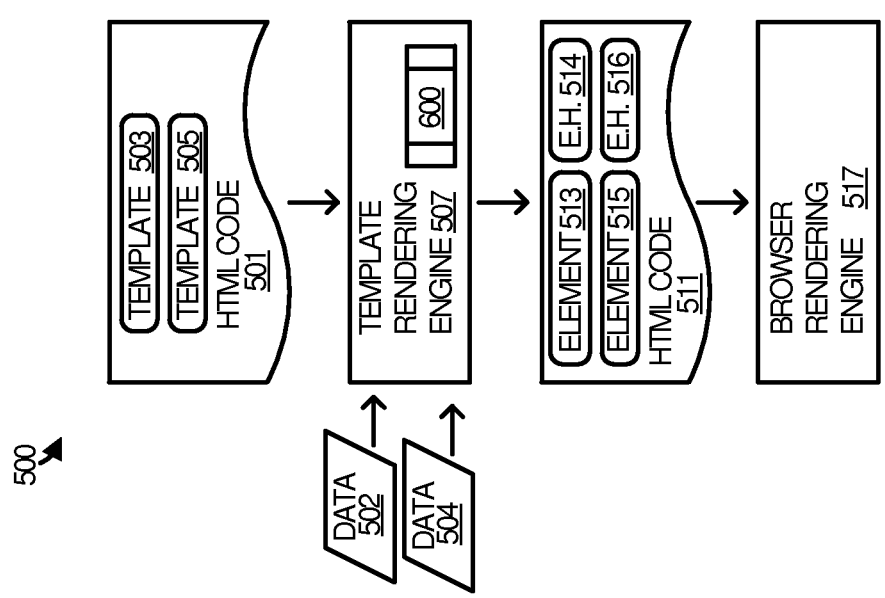

```
Foo:
<div>{%template bar Book}</div>                                801 return function(data, result)
{
    for (var i = 0; i < operations.length; i++)
        operations[i](data, result);
};                                                             803 function StringOperation(string)
{
    return function(data, result) { result.push(string); };
}
function TemplateOperation(templateName, path)
{
    return function(data, result)
    {
        var value = getDataValueAtPath(data, path);
        m_compiledTemplates[templateName](value, result);
    };
}                                                              805
```

FIGURE 8

UNBALANCED MAPPING BETWEEN DESKTOP AND MOBILE PAGES

RELATED APPLICATIONS

This application is related to, claims priority to, and incorporates by reference in its entirety U.S. Application No. 61/905,500, filed on Nov. 18, 2013, and entitled "Template-Based Client-Rendering Platform."

TECHNICAL BACKGROUND

Users of touch-centric mobile devices (e. g. cell phones, tablets, laptops with touch screens), or any other type of device, commonly desire to access and interact with pages generated by a collaboration platform, such as the SHAREPOINT collaboration platform from MICROSOFT CORPORATION. Previously, a mobile-specific user interface ("UI") was typically generated for these types of pages.

Frequently, however, these types of pages are not designed for touch screens and so most of the UI is made up of small UI elements that are difficult to manipulate using touch-based devices. Another downside is that the previous solutions are server-based. This means that the HTML to be rendered in a web browser on a touch-based device is generated on the server and downloaded to the device for each viewed page. This configuration increases the amount of data being transferred from the server to the client and can results very static page UI.

OVERVIEW

Provided herein are systems, methods, and software to enhance the user experience with collaboration services or any other type of online service. Implementations disclosed herein advance HTML rendering in web browsers. Other implementations advance redirection between desktop and mobile versions of web pages.

In at least one implementation, a template rendering engine facilities enhanced event handler attachment when executed by a processing system in the context of a browser application. The template rendering engine examines hypertext markup language (HTML) code downloaded to the browser for templates encoded in the HTML code. When a template is encountered in the HTML code, the template rendering engine examines the template for event handling information indicative of at least an element to render in a web page and an event handler to attach to the element in the web page. The template rendering engine then produces new HTML code for the browser to consume when rendering the web page, the new HTML code comprising the element and the event handler attached to the element.

In at least one other implementation a collaboration service is disclosed that hosts various collaboration sites. Each of the sites includes desktop pages and mobile pages. A routing service redirects mobile requests for the desktop pages to the mobile pages in accordance with a desktop-to-mobile mapping that defines an unbalanced correspondence between the desktop pages and the mobile pages.

The routing service also redirects desktop requests for the mobile pages to the desktop pages in accordance with a mobile-to-desktop mapping that defines a balanced correspondence between them desktop pages and the mobile pages.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates an operational scenario in an implementation.

FIG. 6 illustrates a template rendering process in an implementation.

FIG. 8 illustrates an example implementation of a template rendering engine.

TECHNICAL DISCLOSURE

Figure 1:
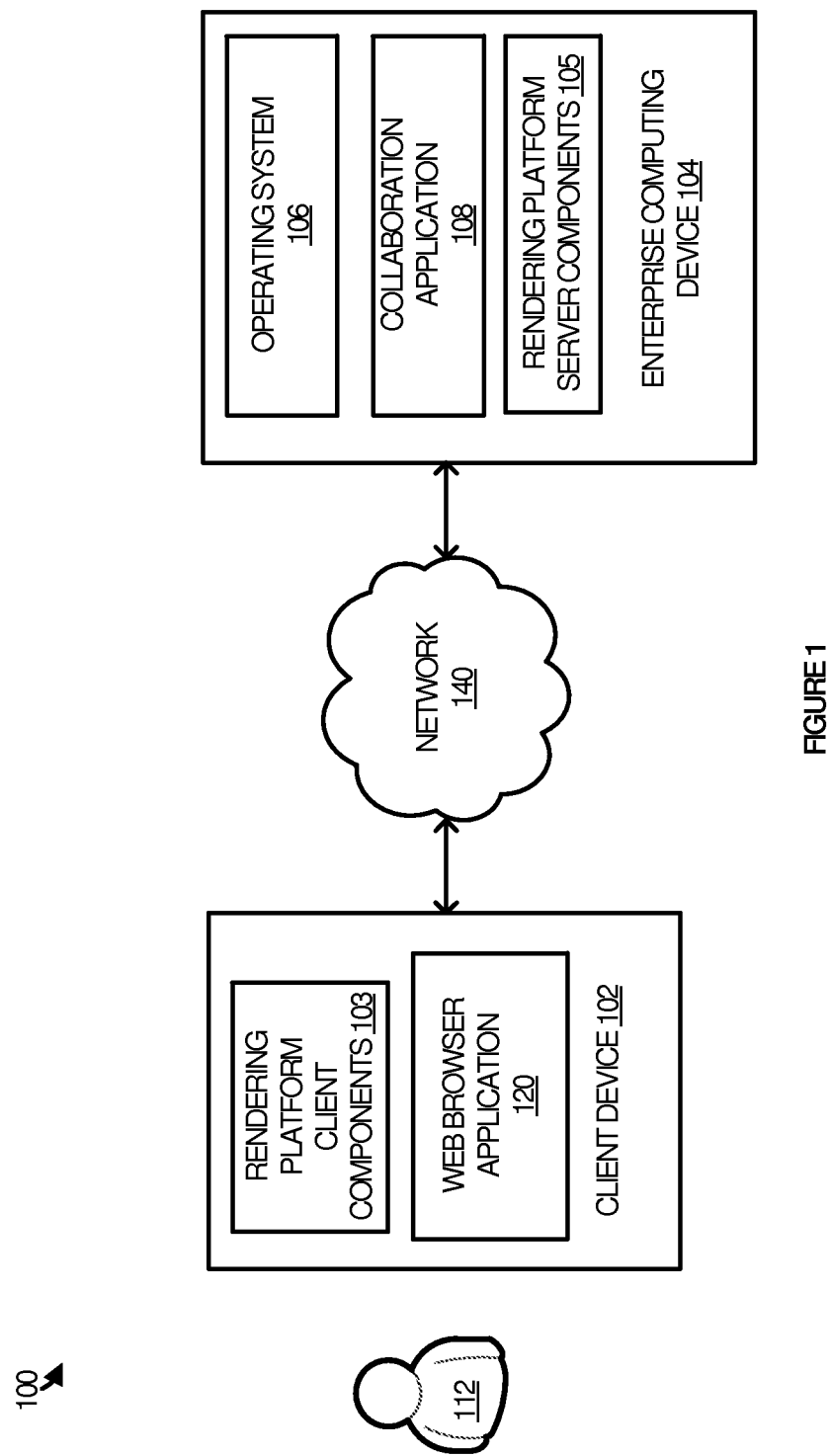
FIG. 1 is a system diagram showing an illustrative operating environment that may be used to implement various embodiments disclosed herein.

Technologies are described herein for providing a template-based client-rendering platform. The embodiments disclosed herein may address some or all of the problems described above by providing a UI with large chunky elements that are very easy to see and easy to manipulate using touch. The platform disclosed herein is also client-side rendered using JavaScript, HTML5 and CSS, and/or other similar technologies. However, the template-based client-rendering described herein are not restricted to touch-based implementations. Rather, the template-based client-rendering technology described herein is applicable to any of a variety of settings and environments, including touch oriented platforms, non-touch platforms, or any combination or variation thereof.

When a user tries to access a site provided using the platform disclosed herein while on a mobile browser such as on a touch-based computing device, the access is detected using a User Agent string and the user is redirected to the "Touch Design" mobile experience disclosed herein. When the user is redirected to a Touch Design bootstrap page, a small set of JavaScript files are downloaded to the user's device. Then, in the client browser, the JavaScript generates the HTML to be rendered by the browser and fetches the user data via a set of REST endpoints. This allows the Touch Design UI disclosed herein to be very dynamic and to support touch-specific gestures that a server-generated UI would not be able to support (e.g. a "swipe" gesture).

It should be appreciated that the subject matter disclosed herein may be implemented as a computer-controlled apparatus, a computer process, a computing system, or as an article of manufacture such as a computer-readable storage medium. These and various other features will be apparent from a reading of the following Detailed Description and a review of the associated drawings.

The following detailed description is directed to technologies for providing a template-based client-rendering platform, in some examples, in conjunction with an enterprise collaboration environment. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several Figures, aspects of a computing system, computer-readable storage medium, and computer-implemented methodologies for providing a template-based client-rendering platform will be presented.

Referring now to FIG. 1, aspects of an operating environment 100 for the various embodiments presented herein will be described. The operating environment 100 shown in FIG. 1 includes a client device 102 operating on or in communication with an enterprise computing device 104 through a network 140. In some embodiments, the client device 102 and/or the enterprise computing device 104 can be implemented using a desktop computer, a laptop computer, a notebook computer, an ultra-portable computer, a netbook computer, or a computing device such as a mobile telephone, a tablet device, a slate device, a portable video game device, or the like. The client device 102 may be a touch-enabled computing device, such as a smartphone or a tablet computing device.

In some configurations, the client device 102 and the enterprise computing device 104 operate in a client-server configuration. As used herein, a "client-server" configuration includes a computing system having one or more resource providers (the "server") that provide resources to one or more resource requestors (the "client"). In the operating environment 100 illustrated in FIG. 1, the client device 102 is described as a client that requests resources through the network 140 from the enterprise computing device 104, which is described as a server. It should be appreciated, however, that the concepts and technologies described herein can be implemented in computing configurations other than a client-server configuration. The operating environment 100 is described herein in terms of a client-server configuration for illustrative purposes only and does not represent an intent to limit the scope of the subject matter disclosed herein. In some configurations, the network 140 can include the Internet, an intranet, or an extranet, or various combinations thereof.

An operating system 106 is executing on the enterprise computing device 104. The operating system 106 is an executable program for controlling various functions of the enterprise computing device 104. The enterprise computing device 104 may also execute a collaboration application 108. The collaboration application 108, in some examples, provides resources to the client device 102 through a Web browser application 120 or other type of application program executing on the client device 102.

The Web browser application 120 is capable of receiving inputs from the client device 102 and providing a display of resources provided by the collaboration application 108 in the manner disclosed herein. In order to render the resources provided by the collaboration application 108, one or more rendering platform client components might be utilized.

The collaboration application 108 may be configured to provide various types of functionality including, but not limited to, allowing users to create, maintain and present a collaborative environment to share information to create and/or collaborate on documents, work together in online groups, and/or share information within an organization. In some configurations, the collaboration application 108 can include a web-based application configured to provide some or all of the functions described above as a service.

In some embodiments, the collaboration application 108 comprises the MICROSOFT SHAREPOINT collaboration application from MICROSOFT CORPORATION. In some embodiments, the collaboration application 108 includes one or more productivity application programs that are part of the GOGGLE DOCS or GOGGLE SITES family of products from Google, Inc. in Mountain View, Calif. In the described embodiments, the collaboration application 108 and/or a client collaboration application are described as including the MICROSOFT SHAREPOINT collaboration application program. It should be understood that examples provided herein using the MICROSOFT SHAREPOINT collaboration application are illustrative, and should not be construed as limiting in any way. The embodiments disclosed herein may be used with other types of collaboration applications. In this regard, the technologies disclosed herein might be utilized with other types of client-server applications. It should also be appreciated that rendering platform client components 103 and/or rendering platform server components 105 may be utilized to provide the functionality disclosed herein.

The embodiments disclosed herein provide at least: 1) a touch-centric UI for interacting with pages provided by the collaboration application 108, such as the SHAREPOINT collaboration application from MICROSOFT CORPORATION; a Web UI based Pivot control; 3) abstracting objects maintained by the collaboration application 108 that have a common class of attributes but with different REST representations into a single API; 4) caching of REST responses to allow for a faster UI; 5) locality of reference for smart logging from client side (aka dynamic contextual logging of additional data); 6) A JavaScript object (a "renderer") that takes in a set of "templates" (invented template language syntax) and a data object, and combines them together into HTML that can be used by the browser. Some aspects about this functionality are: 1) easy to read HTML-like template language; 2) certain "constructs" that have built-in logic. For example: for each construct that applies a template to every element in an array, templateChoice construct that can choose which template to apply based on information from the data object, and easy attaching of an event handler.

An example is: <div onclick="{+myClick}"></div>. This attaches an onclick handler named "myClick" to this <div> element that a user can register their function with. A template is given as a string. However, the system "compiles" this template into a function. In this sense, "compiling" a template means parsing the relevant information about the template from the string and creating a list of "operations" to perform when rendering the template. Since templates are "compiled" into functions, rendering a template is just calling the function. Using "compiled" templates in this way has a noticeable performance gain. Additional details regarding these aspects are provided below.

The embodiments disclosed herein also include a template rendering system (TRS). The TRS is HTML markup that is given to the Web browser application 120 to render to the screen. The inputs to TRS are "templates" that describe the data and how it should look. These two inputs are stored separately and the TRS combines the data into the templates dynamically at render time to form the final HTML markup that is given to the browser.

A technology that performs a similar action is XSLT. XSLT also has its own "template" syntax that combines data and templates together into a final HTML markup. However, one difference is that XSLT runs on the server (i.e. the enterprise computing device 104). The limitation of this is that the server must have both the templates and the data, and must spend computation power to perform the algorithm for combining the data into the templates. On the other hand, the TRS runs in the client as JavaScript executed by the web browser application 120. This means that the client performs the combining algorithm so the server doesn't have to, and also that the server can choose to only store the data and let some other third party entity (such as CDNs—Content Delivery Networks) serve the templates.

The "Touch Design" disclosed herein also includes logic that enables a user 112 to be redirected between equivalent mobile and desktop pages. The logic determines if the user 112 is using a mobile or desktop client based upon the string that identifies their user agent. The user agent string is compared against a known list of mobile user agents, and if the string matches one of these known mobile user agents, then the logic will identify the client as being a mobile user agent. If a user using a mobile client navigates to a desktop page, the user will be redirected to the equivalent mobile page. Likewise if a desktop client navigates to a mobile Touch page, the logic redirects them to the corresponding desktop page. Redirection is performed in one embodiment by defining two mappings. One mapping defines what mobile page to redirect to given a mobile Desktop page. The Key in this mapping a tuple made up of both the List Template Type and the View ID. The corresponding Value in the mapping is the name of the mobile Touch page to redirect to. The other mapping defines what desktop page to redirect to given a mobile Touch page. The Key in this mapping is the name of the Touch page, and the Value in the mapping is the name of the desktop page.

The Mobile Touch experience relies on the ability to redirect users from pages intended for consumption on the desktop to the equivalent "mobile" page and vice-versa. The commonly used approach to solving this problem is to perform a redirect of the user's browser when they land on a desktop page and are identified as a known mobile client. Likewise, a user with a desktop client can be redirected to the equivalent desktop page when landing a mobile page.

The approach disclosed herein differs from this commonly used solution in that the desktop page is defined not as a fixed URL or page, but as a composition of both a list type and a view ID. This approach enables the redirection to be more flexible in handling cases where there may be multiple pages containing the same list view (a many-to-one mapping), and to support future extensibility. The implementation uses a tuple consisting of the list template type and view ID as the "key" in the mapping. This enables the implementation to redirect from many pages containing the same list/view pairing.

The Touch Design described herein also includes a new logging paradigm. Other logging systems will have multiple logging levels (e. g. Verbose, Medium, High, and Unexpected) and every log in the code is written to the logging system. Since Touch Design is a pure client side rendered JavaScript application and expected to be running on a slow data connection, uploading all the logs from client to server would slow down the performance of the page and negatively interfere with the user's interaction.

To solve this and potentially other problems, the embodiments disclosed herein include a system that has only two levels of logging. There is a low level log called "Boring." When writing a boring log, the system caches that log in a fixed size queue. Because boring logs are not automatically uploaded, it makes writing a boring log very fast and allows developers to freely log anything that they feel would be useful if something goes wrong. The other level is a high log level that is called "Interesting." When an interesting log is written, the system uploads not just that interesting log, but also a set of the latest boring logs. The idea is that the boring logs are only interesting in the context of an interesting log and that an interesting log itself does not give enough detail to debug the problem without the last couple of boring logs.

As mentioned above, a typical logging system will have multiple logging levels (e. g. Verbose, Medium, High, and Unexpected) and every log entry submitted to the logging system is tagged with a specific logging level. The logging system would make the choice to commit a log entry to durable storage on a per log entry level. In these types of logging systems there is a system wide (or perhaps a component wide) setting to specify which log level should be written to storage. Only log entries with a logging level as high or higher to the system setting are written to durable storage and all other lower log entries are discarded and never written to durable storage. This approach has several downsides. The main being that in order to save on storage space a system usually runs with a high log level. This means that when something bad happens (aka interesting to the administrators) the system will only write out the few log entries that meet the high logging level set in the system. These log entries are enough to notify the administrators that something bad happened but usually do not contain enough information for administrators to determine what exactly happened and, more importantly, why this interesting event happened. The side effect of this logging system is that the administrator needs to lower the logging level and then try to reproduce the issue. If the issue is not easily reproducible, then they need to leave the logging level low until the issue is reproduced, which can cause strain on the system (disk space, CPU utilization, memory, etc.) because a large number us logs written to storage that do not help investigate this issue.

Since the Touch Design disclosed herein is a pure client side rendered JavaScript application and expected to be running on a slow data connection, uploading all the logs from client to server would slow down the performance of the page and negatively interfere with the user's interaction.

The systems disclosed herein also includes a mechanism that allows for a uniform way of interacting with multiple different data endpoints. This system is an extensible model to allow access multiple different REST endpoints with a minimum amount of effort, while reusing most of the common code needed to interact with SharePoint. In this system, a set of adaptors is created that that allows for abstracting away the specifics of the SharePoint object to allow for reuse. These adaptors can interact with any JSON data in a common way, thus allowing for interaction with all data provided by the collaboration system in unified way.

In the Touch Design datapipes, a caching mechanism is also implemented that data to be remembered from the last time a REST endpoint was accessed. This allows cached data to be displayed to the user while the client is in the process of fetching an updated version of that data. This allows for the Touch Design to feel very responsive to the user when the Touch Design is started and while switching from view to view. Touch Design uses the browser's DOM Local Storage to store cached data. Sometimes DOM Local Storage is not available. We created a way of detecting if DOM Local Storage is available and if it is not, replace the use of DOM Local Storage with a custom in memory storage solution.

An improved pivot control is also disclosed herein. The new pivot control includes added visuals to show the pivots dynamically sliding as the user swipes. Inertia has also been added to make sure that the user does not slide the pivot more than one spot to the left or right. This is accomplished using JavaScript, HTML5 and CSS.

Referring ahead to FIG. 5, an operational scenario 500 is illustrated that demonstrates an implementation of enhanced template rendering as contemplated herein. In operation, HTML code 501 is downloaded to a client from a server. HTML code 501 includes various templates represented by template 503 and template 505. In some scenarios, HTML code 501 also includes template rendering engine 507, although template rendering engine 507 may be provided from HTML code 501 in other scenarios.

Template rendering engine 507 employs a template rendering process 600 in order to combine data with templates in new HTML code that can be provided to browser rendering engine 517. Referring parenthetically to the steps illustrated in FIG. 6 with respect to template rendering process 600, template rendering engine 507 examines HTML code 501 for any templates (step 601). For a given template that is found in HTML code 501, template rendering engine 507 examines the template for event handling information (step 603). The event handling information may, for example identify a specific event handler to attach to a specific element. Template rendering engine 507 then produces new code that includes the element and the event handler attached to the element (step 605).

In this example scenario, template rendering engine 507 combines data 502 with template 503 and combine data 504 with template 505 and outputs new HTML code represented by HTML code 511. HTML code 511 includes element 513 and event handler 514, which result from the combination of data 502 and template 503. HTML code 511 also includes element 515 and event handler 516, which result from the combination of data 504 and template 505. HTML code 511 can be handed off to browser rendering engine 517.

The details of an example template language for implementing a template rendering engine is specified below. There are two things to note. First, if a template requires a templateName, this is the string name of another template. Second, if a template requires a path, this refers to a path to the value desired through a current data object (similar to an xpath). Templates are called with a data object, and the path specifies what part of the data object the template wants. If the template form is looking for a path and no path is specified in the actual template, then the path defaults to ".", which means to pass along the current data object.

Following are the constructs the template language supports.

The syntax for a value construct is: {=path}. This template is simply replaced by the value referenced by the path. The most common use case is to put the actual data value in the position. Another way to use this is to use this form to specify an attribute (such as a class) that might be different depending on the data item.

The syntax for a function construct is: {±functionName}. This template is replaced by a call to the specified function. It is most commonly used by events. An example is: <button onclick="{+myButtonClicked}">. This template actually expands to a call to the FunctionDispatcher, giving it the name of the function. This functionName is the key to an internal dictionary of string->function for the FunctionDispatcher to call.

The syntax for a template construct is: { % template templateName path}. This template is replaced by the contents of expanding the subtemplate templateName with the data object referenced by path. This allows templates to recursively include other templates.

The syntax for a "foreach" construction is: {% foreach templateName path}. The data object referenced by path must be an array. This construct applies the templateName template to each element in the array.

The syntax for a "templatechoice" construct is: {% templateChoice templatePath path}. This is like the template construct, but with an added level of indirection. Instead of specifying the name of template you want to use directly, you specify a path in the data object to the name of the template. This allows the data object to choose what template to use. This can be useful when different data elements should be rendered differently.

The language also includes a template replacement algorithm. The template replacement algorithm refers to the actual code used that turns a template from the instant templating language into actual HTML. To do so, a "Compiled String Replace" technique is utilized. This technique takes advantage of JavaScript's functional nature and considers a template to be just a function. Rendering a template is then just calling the function. However, a preparatory step is performed where the engine compiles each template sting into a template function that contains a list of operations (which are functions).

At runtime, calling a template function involves performing its list of operations that it complied. An operation (which is a function) takes the data to operate on as a runtime parameter, but other information processed at compile time (such as the path) is remembered via closure.

FIG. 8 illustrates an example representation 800 of a template rendering engine. In particular, the example representation 800 includes template 801 ("foo") in an example that compiles into a function that contains the following three operations: 1) StringOperation ("<div>"); 2) TemplateOperation ("bar", "Book"); and 3) StringOperation ("</div>").

The runtime iterates through the operations and calls them with the passed in data object. Template function 803 is representative of a template function that is created after compiling. Operation function 805 is also represented in FIG. 8 and is representative of an operation function.

An alternative to the Compiled String Replace technique outlined above includes Node Injection. Node Injection does not perform string manipulations, but rather manipulates DOM nodes in memory instead. Another alternative is String Replace, where templates are stored in their string form, and at render time, the template rendering engine performs a series of string replacements to produce the final HTML code.

In order to hook up events at render time, the template rendering engine also includes a Function Dispatcher object that helps to call the right event handler. An alternative to having a Function Dispatcher involves controls that use templates to have an OnPostRender event that finds the DOM element nodes in memory and attach event handlers to them, which is slow and processor intensive by comparison.

The Function Dispatcher keeps an internal data structure (referred to it as m_functions) of type Anay<Dictionary<string, function>> to store the functions. Each control that wants to register a function will be assigned a unique object ID to be used with the dispatcher. This object ID is the index into m_functions for that control. In this way, multiple instances of a control can be on the page and there won't be name collisions. The Dictionary<string, function> for each control is a mapping of a string function name to the actual function itself.

To specify an event for the Function Dispatcher, templates use the Function construct syntax. For example, <div onclick="{+myClick}"></div> will attach an onclick handler to the div that is identified in the Function Dispatcher with name "myClick". Controls will then register the handlers they want to use for this event with the Function Dispatcher using this name.

In operation, when a template is compiled, the Function construct string is replaced by a call to Renderer.FunctionDispatcher.Execute(event, objID, functionName), where functionName is filled in by the template and objID was passed in to the compilation. Renderer.FunctionDispatcher.Execute is visible from the global scope, and will call the handlers registered with it for that name.

Figure 7:
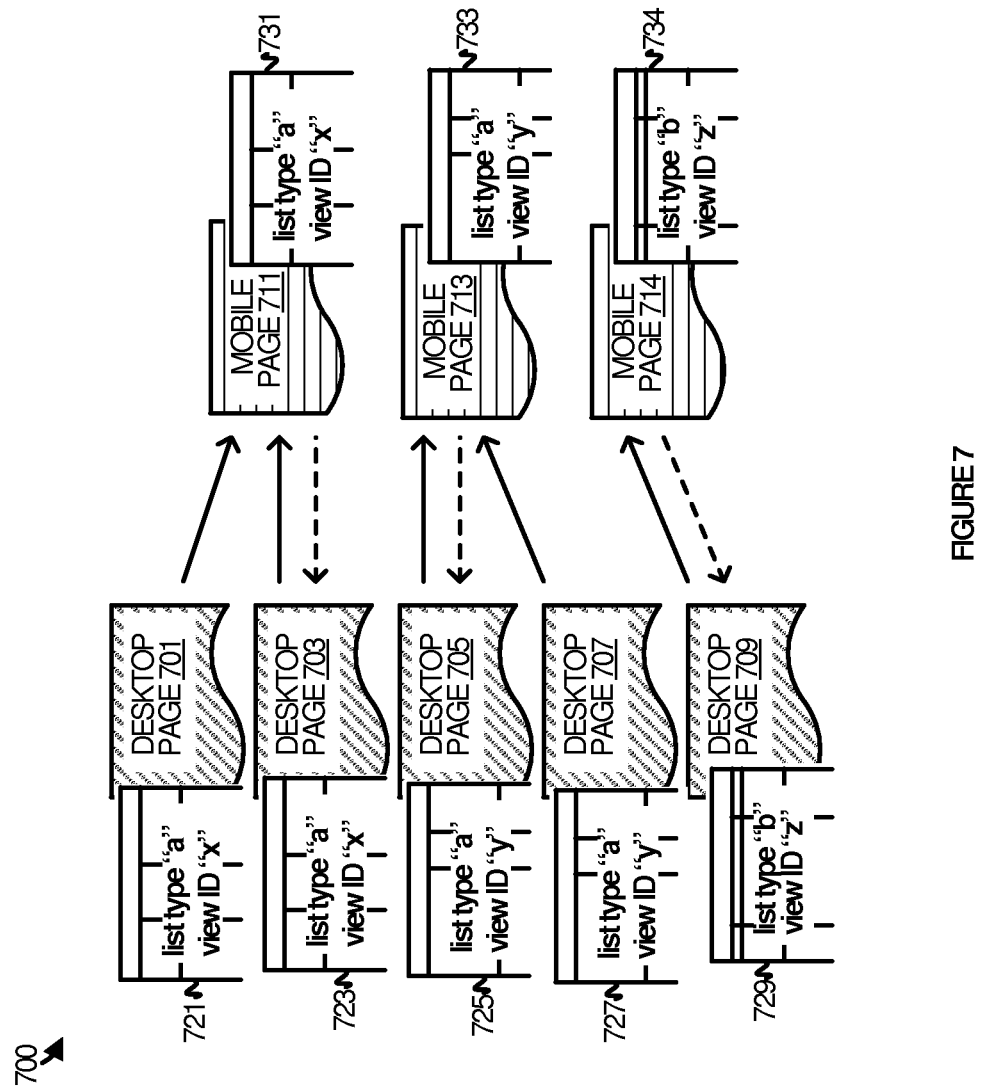
FIG. 7 illustrates desktop-to-mobile page mapping and mobile-to-desktop page mapping in an implementation.

Referring ahead to FIG. 7, mapping scenario 700 illustrates desktop-to-mobile mapping and mobile-to-desktop mapping in an implementation. In operation, any of a variety of computing devices may make requests for web pages. Client device 102 is representative of one such device. The web pages may be part of an online service that a user access, such as a collaboration service, a productivity service, a gaming service, a multimedia service, or any variation or combination thereof.

Mapping scenario 700 involves a site that has both desktop pages and mobile pages. The desktop pages are represented by desktop page 701, desktop page 703, desktop page 705, desktop page 707, and desktop page 709. The mobile pages are represented by mobile page 711, mobile page 713, and mobile page 714.

Desktop pages are those web pages that are formatted in accordance with a desktop format, whereas mobile pages are web pages formatted in a mobile format. When a desktop client requests a desktop page, a routing function or service directs the desktop client to the desktop page. Similarly, when a mobile client requests a mobile page, the routing service can route the mobile client to the mobile page.

However, there may be times when a mobile client requests a desktop page and when a desktop client requests a mobile page. Rather than serve a page to a client in a sub-optimal format for that client, the routing service applies the mappings illustrated in FIG. 7 to redirect the requests to a more appropriate page.

The desktop-to-mobile mappings illustrated in FIG. 7 are based on a correspondence between list types and view identifiers (IDs) that are included in each page. For example, desktop page 701 includes a list view 721 of a list. List view 721 is a view of a list and has a list type ("a") and a view ID ("x"). Mobile page 711 also includes a list view 731. List view 731 is also a view of a list and includes a list type ("a") and a view ID ("x"). In other words, list view 721 and list view 731 are views of the same underlying list. Accordingly, desktop page 701 is mapped to mobile page 711. When a mobile user lands on desktop page 701, the request is redirected to mobile page 711 instead, per the desktop-to-mobile mapping applied by the routing service.

The desktop-to-mobile mapping illustrated in FIG. 7 may be considered an unbalanced mapping because more than one desktop pages map to a single mobile page. For example, desktop page 703, which includes list view 723, maps to mobile page 711, as list view 723 includes the same list type and view ID as list view 731. Desktop page 705 and desktop page 707 both map to mobile page 713 because both pages include list views 725 and 727 respectively that have the same list type and view ID as list view 733. For the same reason, desktop page 709 maps to 734: list view 729 includes the same list type and view ID as list view 734.

In the opposite direction, a balanced correspondence may exist with respect to a mobile-to-desktop mapping. When a mobile page is requested by a desktop client, the routing service redirects the request to a corresponding desktop page. For example, a desktop request for mobile page 711 would redirect to desktop page 701; a desktop request for mobile page 713 would redirect to desktop page 705; and a desktop request for mobile page 714 would redirect to desktop page 709.

While FIG. 7 illustrates a scenario in which mobile pages are redirected to a desktop page that, in the reverse direction, also maps to the mobile page, this is not necessary. Rather, a mobile page could be mapped to an entirely different desktop page. For example, a desktop request for mobile page 711 could be redirected to an entirely different page, other than desktop page 701 or desktop page 703.

It should be understood the embodiments disclosed herein provide various technologies for implementing a template-based client-rendering platform. It should be understood that the operations of these methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The operations of the methods presented herein as being implemented, at least in part, by the Web browser application 120 or another application executing on the client device 102, the collaboration application 108, or combinations thereof. One or more of the operations of the methods may alternatively or additionally be implemented, at least in part, by the similar components in either the client device 102 and/or the enterprise computing device 104.

Figure 2:
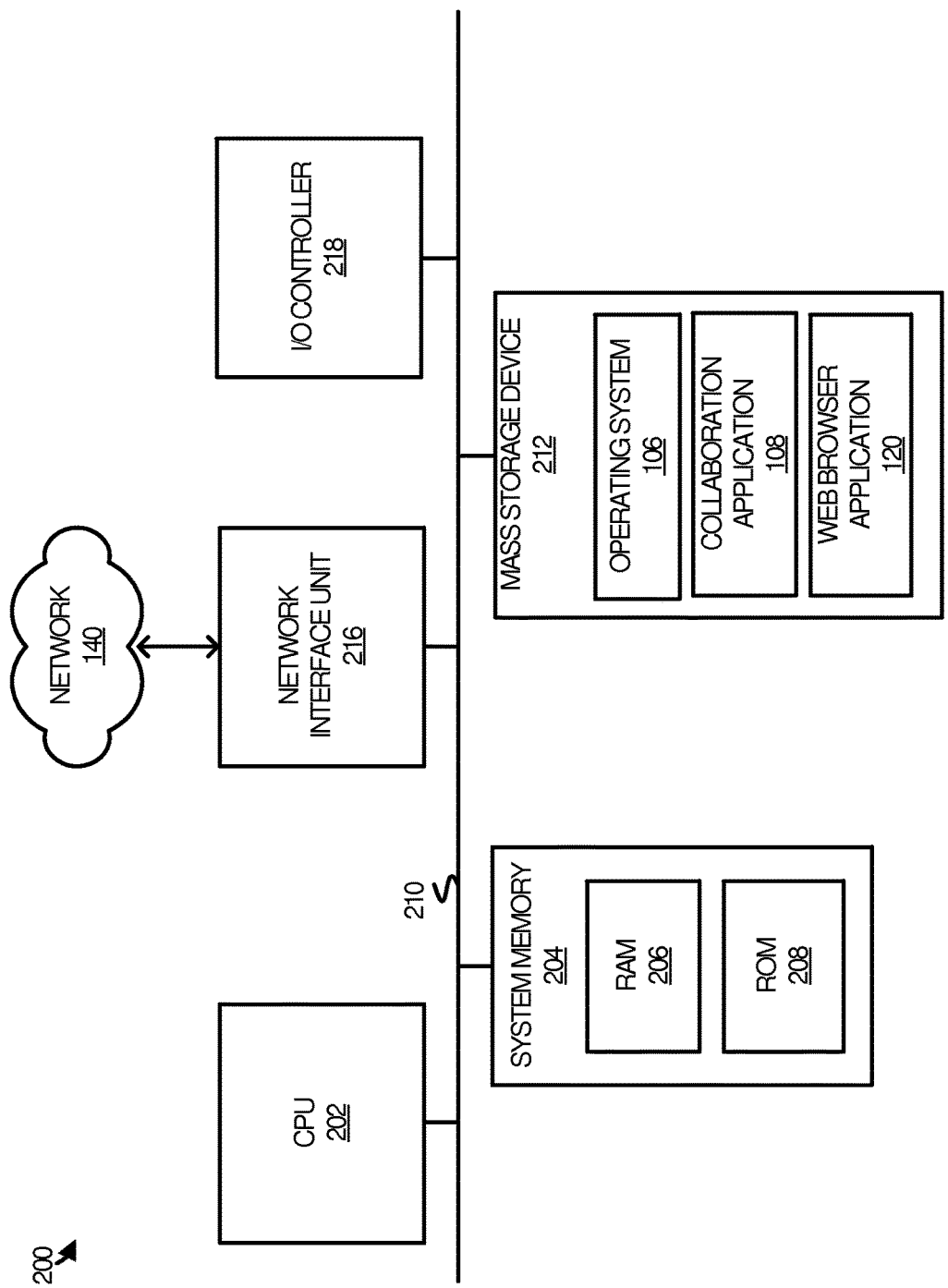
FIG. 2 is a computer architecture diagram showing an illustrative computer hardware and software architecture for a computing system capable of implementing aspects of the embodiments presented herein.

FIG. 2 is a computer architecture diagram showing an illustrative computer hardware and software architecture for a device capable of executing the software components described herein, represented by computer architecture 200. Thus, the computer architecture 200 illustrated in FIG. 2 illustrates an architecture for a server computer, mobile phone, a PDA, a smart phone, a desktop computer, a netbook computer, a tablet computer, and/or a laptop computer. The computer architecture 200 may be utilized to execute any aspects of the software components presented herein.

The computer architecture 200 illustrated in FIG. 2 includes a central processing unit ("CPU") 202, a system memory 204, including a random access memory 206 ("RAM") and a read-only memory ("ROM") 208, and a system bus 210 that couples the system memory 204 to the CPU 202. A basic input/output system containing the basic routines that help to transfer information between elements within the computer architecture 200, such as during startup, is stored in the ROM 208. The computer architecture 200 further includes a mass storage device 212. When utilized to implement the enterprise computing device 104, the mass storage device 212 may store the operating system 106 from FIG. 1 and one or more application programs including, but not limited to, the collaboration application 108.

The mass storage device 212 is connected to the CPU 202 through a mass storage controller (not shown) connected to the system bus 210. The mass storage device 212 and its associated computer-readable media provide non-volatile storage for the computer architecture 200. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 200.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 200. For purposes of the claims, the phrases "computer storage medium," "computer readable storage media," and variations thereof, do not include waves, signals, and propagated signals per se.

According to various embodiments, the computer architecture 200 may operate in a networked environment using logical connections to remote computers through a network such as the network 140. The computer architecture 200 may connect to the network 140 through a network interface unit 216 connected to the system bus 210. It should be appreciated that the network interface unit 216 may also be utilized to connect to other types of networks and remote computer systems. The computer architecture 200 also may include an input/output controller 218 for receiving and processing input from a number of other devices, including a keyboard, mouse, or electronic stylus. Similarly, the input/output controller 218 may provide an output to a display screen, a printer, or other type of output device.

It should be appreciated that the software components described herein may, when loaded into the CPU 202 and executed, transform the CPU 202 and the overall computer architecture 200 from a general-purpose computing system into a special-purpose computing system customized to facilitate the functionality presented herein. The CPU 202 may be constructed from any number of transistors or other discrete circuit elements, which may individually or collectively assume any number of states. More specifically, the CPU 202 may operate as a finite-state machine, in response to executable instructions contained within the software modules disclosed herein. These computer-executable instructions may transform the CPU 202 by specifying how the CPU 202 transitions between states, thereby transforming the transistors or other discrete hardware elements constituting the CPU 202.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 200 in order to store and execute the software components presented herein. It also should be appreciated that the computer architecture 200 may include other types of computing devices, including hand-held computers, embedded computer systems, personal digital assistants, and other types of computing devices known to those skilled in the art. It is also contemplated that the computer architecture 200 may not include all of the components shown in FIG. 2, may include other components that are not explicitly shown in FIG. 2, or may utilize an architecture completely different than that shown in FIG. 2.

Figure 3:
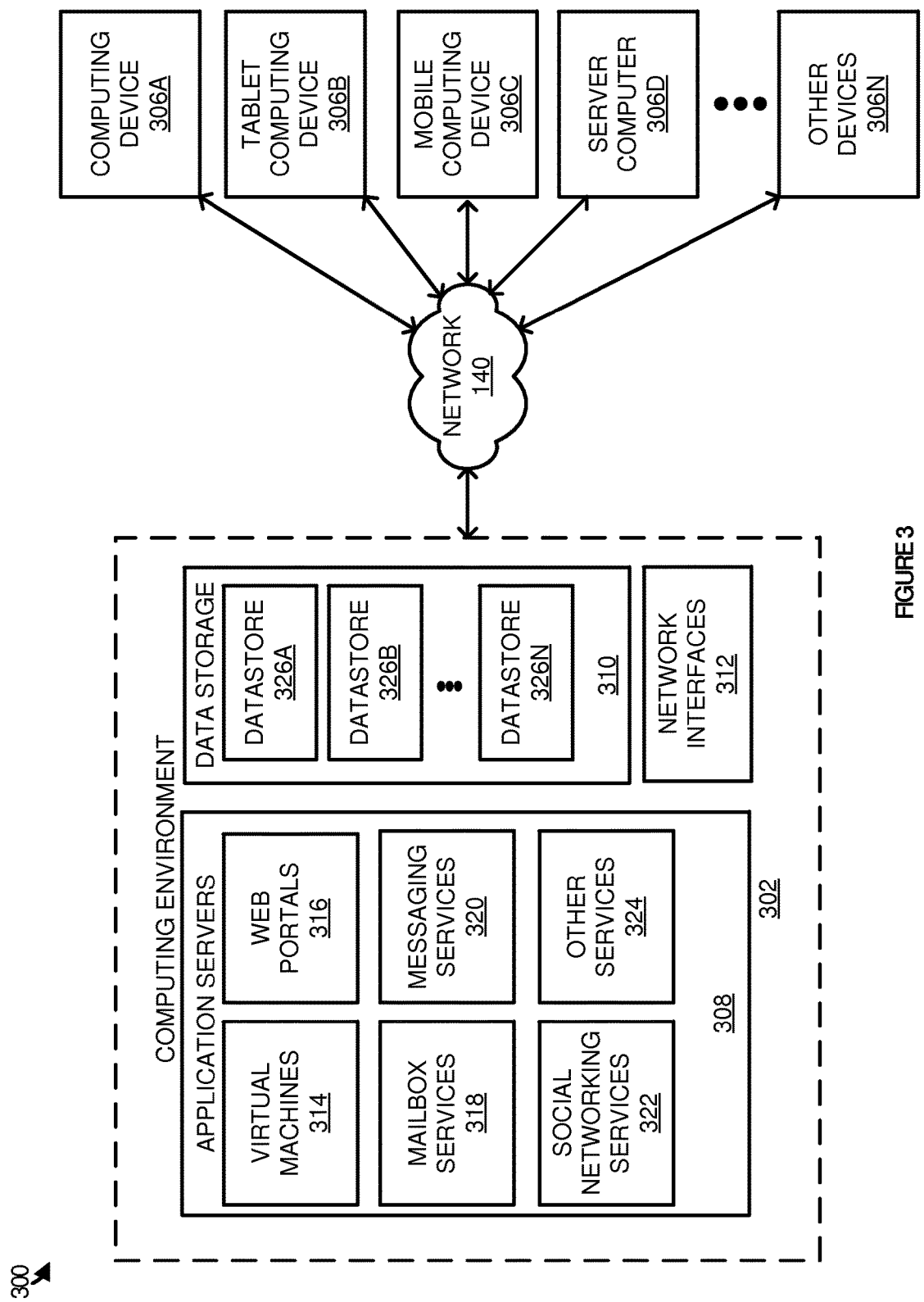
FIG. 3 is a diagram illustrating a distributed computing environment capable of implementing aspects of the embodiments presented herein.

FIG. 3 illustrates an illustrative distributed computing environment 300 capable of executing the software components described herein for providing the concepts and technologies described herein. Thus, the distributed computing environment 300 illustrated in FIG. 3 can be used to provide the functionality described herein. The distributed computing environment 300 thus may be utilized to execute any aspects of the software components presented herein.

According to various implementations, the distributed computing environment 300 includes a computing environment 302 operating on, in communication with, or as part of the network 140. The network 140 also can include various access networks. One or more client devices 306A-306N (hereinafter referred to collectively and/or generically as "clients") can communicate with the computing environment 302 via the network 140 and/or other connections (not illustrated in FIG. 3). In the illustrated embodiment, the clients 306 include a client device 306A such as a laptop computer, a desktop computer, or other computing device; a slate or tablet computing device ("tablet computing device") 306B; a mobile computing device 306C such as a mobile telephone, a smart phone, or other mobile computing device; a server computer 306D; and/or other devices 306N. It should be understood that any number of clients 306 can communicate with the computing environment 302. It should be understood that the illustrated clients 306 and computing architectures illustrated and described herein are illustrative, and should not be construed as being limited in any way.

In the illustrated embodiment, the computing environment 302 includes application servers 308, data storage 310, and one or more network interfaces 312. According to various implementations, the functionality of the application servers 308 can be provided by one or more server computers that are executing as part of, or in communication with, the network 304. The application servers 308 can host various services, virtual machines, portals, and/or other resources. In the illustrated embodiment, the application servers 308 host one or more virtual machines 314 for hosting applications or other functionality. According to various implementations, the virtual machines 314 host one or more applications and/or software modules for providing the functionality described herein. It should be understood that this embodiment is illustrative, and should not be construed as being limiting in any way. The application servers 308 also host or provide access to one or more Web portals, link pages, Web sites, and/or other information ("Web portals") 316.

According to various implementations, the application servers 308 also include one or more mailbox services 318 and one or more messaging services 320. The mailbox services 318 can include electronic mail ("email") services. The mailbox services 318 also can include various personal information management ("PIM") services including, but not limited to, calendar services, contact management services, collaboration services, and/or other services. The messaging services 320 can include, but are not limited to, instant messaging services, chat services, forum services, and/or other communication services.

The application servers 308 also can include one or more social networking services 322. The social networking services 322 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 322 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 322 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from MICROSOFT CORPORATION of Redmond, Wash. Other services are possible and are contemplated.

The social networking services 322 also can include commenting, blogging, and/or microblogging services. Examples of such services include, but are not limited to, the YELP commenting service, the KUDZU review service, the OFFICETALK enterprise microblogging service, the TWITTER messaging service, the GOGGLE BUZZ service, and/or other services. It should be appreciated that the above lists of services are not exhaustive and that numerous additional and/or alternative social networking services are not mentioned herein for the sake of brevity. As such, the above embodiments are illustrative, and should not be construed as being limited in any way.

As mentioned above, the computing environment 302 can include the data storage 310. According to various implementations, the functionality of the data storage 310 is provided by one or more databases operating on, or in communication with, the network 140. The functionality of the data storage 310 also can be provided by one or more server computers configured to host data for the computing environment 302. The data storage 310 can include, host, or provide one or more real or virtual datastores 326A-326N (hereinafter referred to collectively and/or generically as "datastores"). The datastores 326 are configured to host data used or created by the application servers 308 and/or other data.

The computing environment 302 can communicate with, or be accessed by, the network interfaces 312. The network interfaces 312 can include various types of network hardware and software for supporting communications between two or more computing devices including, but not limited to, the clients 306 and the application servers 308. It should be appreciated that the network interfaces 312 also may be utilized to connect to other types of networks and/or computer systems.

It should be understood that the distributed computing environment 300 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 300 provides the software functionality described herein as a service to the clients 306. It should be understood that the clients 306 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 300 to utilize the functionality described herein.

Figure 4:
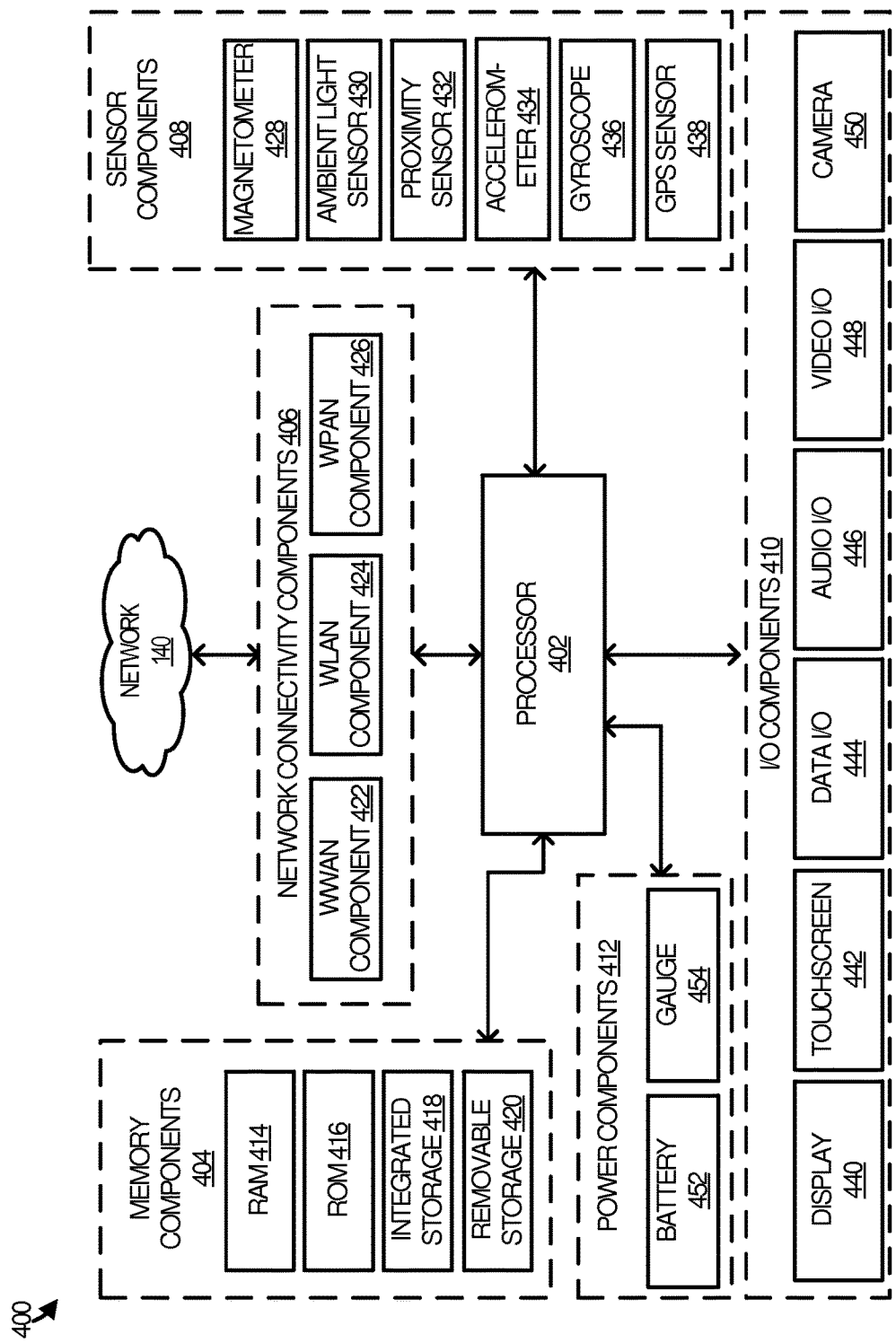
FIG. 4 is a computer architecture diagram illustrating a computing device architecture capable of implementing aspects of the embodiments presented herein.

Turning now to FIG. 4, an illustrative computing device architecture 400 for a computing device that is capable of executing various software components described herein. The computing device architecture 400 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 400 is applicable to any of the clients 306 shown in FIG. 3. Furthermore, aspects of the computing device architecture 400 may be applicable to traditional desktop computers, portable computers (e.g., laptops, notebooks, ultra-portables, and netbooks), server computers, and other computer systems, such as described herein with reference to FIG. 1. For example, the single touch and multi-touch aspects disclosed herein below may be applied to desktop computers that utilize a touchscreen or some other touch-enabled device, such as a touch-enabled track pad or touch-enabled mouse.

The computing device architecture 400 illustrated in FIG. 4 includes a processor 402, memory components 404, network connectivity components 406, sensor components 408, input/output ("I/O") components 410, and power components 412. In the illustrated embodiment, the processor 402 is in communication with the memory components 404, the network connectivity components 406, the sensor components 408, the I/O components 410, and the power components 412. Although no connections are shown between the individuals components illustrated in FIG. 4, the components can interact to carry out device functions. In some embodiments, the components are arranged so as to communicate via one or more busses (not shown).

The processor 402 includes a central processing unit ("CPU") configured to process data, execute computer-executable instructions of one or more application programs, and communicate with other components of the computing device architecture 400 in order to perform various functionality described herein. The processor 402 may be utilized to execute aspects of the software components presented herein and, particularly, those that utilize, at least in part, a touch-enabled input.

In some embodiments, the processor 402 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 402 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 402 is, or is included in, a system-on-chip ("SoC") along with one or more of the other components described herein below. For example, the SoC may include the processor 402, a GPU, one or more of the network connectivity components 406, and one or more of the sensor components 408. In some embodiments, the processor 402 is fabricated, in part, utilizing a package-on-package ("PoP") integrated circuit packaging technique. Moreover, the processor 402 may be a single core or multi-core processor.

The processor 402 may be created in accordance with an ARM architecture, available for license from ARM HOLDINGS of Cambridge, United Kingdom. Alternatively, the processor 402 may be created in accordance with an x86 architecture, such as is available from INTEL CORPORATION of Mountain View, Calif. and others. In some embodiments, the processor 402 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 404 include a random access memory ("RAM") 414, a read-only memory ("ROM") 416, an integrated storage memory ("integrated storage") 418, and a removable storage memory ("removable storage") 420. In some embodiments, the RAM 414 or a portion thereof, the ROM 416 or a portion thereof, and/or some combination the RAM 414 and the ROM 416 is integrated in the processor 402. In some embodiments, the ROM 416 is configured to store a firmware, an operating system or a portion thereof (e.g., operating system kernel), and/or a bootloader to load an operating system kernel from the integrated storage 418 or the removable storage 420.

The integrated storage 418 can include a solid-state memory, a hard disk, or a combination of solid-state memory and a hard disk. The integrated storage 418 may be soldered or otherwise connected to a logic board upon which the processor 402 and other components described herein also may be connected. As such, the integrated storage 418 is integrated in the computing device. The integrated storage 418 is configured to store an operating system or portions thereof, application programs, data, and other software components described herein.

The removable storage 420 can include a solid-state memory, a hard disk, or a combination of solid-state memory and a hard disk. In some embodiments, the removable storage 420 is provided in lieu of the integrated storage 418. In other embodiments, the removable storage 420 is provided as additional optional storage. In some embodiments, the removable storage 420 is logically combined with the integrated storage 418 such that the total available storage is made available and shown to a user as a total combined capacity of the integrated storage 418 and the removable storage 420.

The removable storage 420 is configured to be inserted into a removable storage memory slot (not shown) or other mechanism by which the removable storage 420 is inserted and secured to facilitate a connection over which the removable storage 420 can communicate with other components of the computing device, such as the processor 402. The removable storage 420 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 404 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEB OS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 406 include a wireless wide area network component ("WWAN component") 422, a wireless local area network component ("WLAN component") 424, and a wireless personal area network component ("WPAN component") 426. The network connectivity components 406 facilitate communications to and from the network 140, which may be a WWAN, a WLAN, or a WPAN. Although a single network, network 140, is illustrated, the network connectivity components 406 may facilitate simultaneous communication with multiple networks. For example, the network connectivity components 406 may facilitate simultaneous communications with multiple networks via one or more of a WWAN, a WLAN, or a WPAN.

The network 140 may be a WWAN, such as a mobile telecommunications network utilizing one or more mobile telecommunications technologies to provide voice and/or data services to a computing device utilizing the computing device architecture 400 via the WWAN component 422. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 140 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 140 may be configured to provide voice and/or data communications with any combination of the above technologies. The network 140 may be configured to or adapted to provide voice and/or data communications in accordance with future generation technologies.

In some embodiments, the WWAN component 422 is configured to provide dual-multi-mode connectivity to the network 140. For example, the WWAN component 422 may be configured to provide connectivity to the network 140, wherein the network 140 provides service via GSM and UMTS technologies, or via some other combination of technologies. Alternatively, multiple WWAN components 422 may be utilized to perform such functionality, and/or provide additional functionality to support other non-compatible technologies (i.e., incapable of being supported by a single WWAN component). The WWAN component 422 may facilitate similar connectivity to multiple networks (e.g., a UMTS network and an LTE network).

The network 140 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 424 is configured to connect to the network 140 via the WI-FI access points. Such connections may be secured via various encryption technologies including, but not limited, WI-FI Protected Access ("WPA"), WPA2, Wired Equivalent Privacy ("WEP"), and the like.

The network 140 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 426 is configured to facilitate communications with other devices, such as peripherals, computers, or other computing devices via the WPAN.

The sensor components 408 include a magnetometer 428, an ambient light sensor 430, a proximity sensor 432, an accelerometer 434, a gyroscope 436, and a Global Positioning System sensor ("GPS sensor") 438. It is contemplated that other sensors, such as, but not limited to, temperature sensors or shock detection sensors, also may be incorporated in the computing device architecture 400.

The magnetometer 428 is configured to measure the strength and direction of a magnetic field. In some embodiments the magnetometer 428 provides measurements to a compass application program stored within one of the memory components 404 in order to provide a user with accurate directions in a frame of reference including the cardinal directions, north, south, east, and west. Similar measurements may be provided to a navigation application program that includes a compass component. Other uses of measurements obtained by the magnetometer 428 are contemplated.

The ambient light sensor 430 is configured to measure ambient light. In some embodiments, the ambient light sensor 430 provides measurements to an application program stored within one the memory components 404 in order to automatically adjust the brightness of a display (described below) to compensate for low-light and high-light environments. Other uses of measurements obtained by the ambient light sensor 430 are contemplated.

The proximity sensor 432 is configured to detect the presence of an object or thing in proximity to the computing device without direct contact. In some embodiments, the proximity sensor 432 detects the presence of a user's body (e.g., the user's face) and provides this information to an application program stored within one of the memory components 404 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 432 are contemplated.

The accelerometer 434 is configured to measure proper acceleration. In some embodiments, output from the accelerometer 434 is used by an application program as an input mechanism to control some functionality of the application program. For example, the application program may be a video game in which a character, a portion thereof, or an object is moved or otherwise manipulated in response to input received via the accelerometer 434. In some embodiments, output from the accelerometer 434 is provided to an application program for use in switching between landscape and portrait modes, calculating coordinate acceleration, or detecting a fall. Other uses of the accelerometer 434 are contemplated.

The gyroscope 436 is configured to measure and maintain orientation. In some embodiments, output from the gyroscope 436 is used by an application program as an input mechanism to control some functionality of the application program. For example, the gyroscope 436 can be used for accurate recognition of movement within a 3D environment of a video game application or some other application. In some embodiments, an application program utilizes output from the gyroscope 436 and the accelerometer 434 to enhance control of some functionality of the application program. Other uses of the gyroscope 436 are contemplated.

The GPS sensor 438 is configured to receive signals from GPS satellites for use in calculating a location. The location calculated by the GPS sensor 438 may be used by any application program that requires or benefits from location information. For example, the location calculated by the GPS sensor 438 may be used with a navigation application program to provide directions from the location to a destination or directions from the destination to the location. Moreover, the GPS sensor 438 may be used to provide location information to an external location-based service, such as E911 service. The GPS sensor 438 may obtain location information generated via WI-FI, WIMAX, and/or cellular triangulation techniques utilizing one or more of the network connectivity components 406 to aid the GPS sensor 438 in obtaining a location fix. The GPS sensor 438 may also be used in Assisted GPS ("A-GPS") systems.

The I/O components 410 include a display 440, a touchscreen 442, a data I/O interface component ("data I/O") 444, an audio I/O interface component ("audio I/O") 446, a video I/O interface component ("video I/O") 448, and a camera 450. In some embodiments, the display 440 and the touchscreen 442 are combined. In some embodiments two or more of the data I/O interface component 444, the audio I/O interface component 446, and the video I/O interface component 448 are combined. The I/O components 410 may include discrete processors configured to support the various interface described below, or may include processing functionality built-in to the processor 402.

The display 440 is an output device configured to present information in a visual form. In particular, the display 440 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 440 is a liquid crystal display ("LCD") utilizing any active or passive matrix technology and any backlighting technology (if used). In some embodiments, the display 440 is an organic light emitting diode ("OLED") display. Other display types are contemplated.

The touchscreen 442 is an input device configured to detect the presence and location of a touch. The touchscreen 442 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 442 is incorporated on top of the display 440 as a transparent layer to enable a user to use one or more touches to interact with objects or other information presented on the display 440. In other embodiments, the touchscreen 442 is a touch pad incorporated on a surface of the computing device that does not include the display 440. For example, the computing device may have a touchscreen incorporated on top of the display 440 and a touch pad on a surface opposite the display 440.

In some embodiments, the touchscreen 442 is a single-touch touchscreen. In other embodiments, the touchscreen 442 is a multi-touch touchscreen. In some embodiments, the touchscreen 442 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 442. As such, a developer may create gestures that are specific to a particular application program.

In some embodiments, the touchscreen 442 supports a tap gesture in which a user taps the touchscreen 442 once on an item presented on the display 440. The tap gesture may be used for various reasons including, but not limited to, opening or launching whatever the user taps. In some embodiments, the touchscreen 442 supports a double tap gesture in which a user taps the touchscreen 442 twice on an item presented on the display 440. The double tap gesture may be used for various reasons including, but not limited to, zooming in or zooming out in stages. In some embodiments, the touchscreen 442 supports a tap and hold gesture in which a user taps the touchscreen 442 and maintains contact for at least a pre-defined time. The tap and hold gesture may be used for various reasons including, but not limited to, opening a context-specific menu.

In some embodiments, the touchscreen 442 supports a pan gesture in which a user places a finger on the touchscreen 442 and maintains contact with the touchscreen 442 while moving the finger on the touchscreen 442. The pan gesture may be used for various reasons including, but not limited to, moving through screens, images, or menus at a controlled rate. Multiple finger pan gestures are also contemplated. In some embodiments, the touchscreen 442 supports a flick gesture in which a user swipes a finger in the direction the user wants the screen to move. The flick gesture may be used for various reasons including, but not limited to, scrolling horizontally or vertically through menus or pages. In some embodiments, the touchscreen 442 supports a pinch and stretch gesture in which a user makes a pinching motion with two fingers (e.g., thumb and forefinger) on the touchscreen 442 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 442. As such, the above gestures should be understood as being illustrative and should not be construed as being limiting in any way.

The data I/O interface component 444 is configured to facilitate input of data to the computing device and output of data from the computing device. In some embodiments, the data I/O interface component 444 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 446 is configured to provide audio input and/or output capabilities to the computing device. In some embodiments, the audio I/O interface component 446 includes a microphone configured to collect audio signals. In some embodiments, the audio I/O interface component 446 includes a headphone jack configured to provide connectivity for headphones or other external speakers. In some embodiments, the audio I/O interface component 446 includes a speaker for the output of audio signals. In some embodiments, the audio I/O interface component 446 includes an optical audio cable out.

The video I/O interface component 448 is configured to provide video input and/or output capabilities to the computing device. In some embodiments, the video I/O interface component 448 includes a video connector configured to receive video as input from another device (e.g., a video media player such as a DVD or BLURAY player) or send video as output to another device (e.g., a monitor, a television, or some other external display). In some embodiments, the video I/O interface component 448 includes a High-Definition Multimedia Interface ("HDMI"), mini-HDMI, micro-HDMI, DisplayPort, or proprietary connector to input/output video content. In some embodiments, the video I/O interface component 448 or portions thereof is combined with the audio I/O interface component 446 or portions thereof.

The camera 450 can be configured to capture still images and/or video. The camera 450 may utilize a charge coupled device ("CCD") or a complementary metal oxide semiconductor ("CMOS") image sensor to capture images. In some embodiments, the camera 450 includes a flash to aid in taking pictures in low-light environments. Settings for the camera 450 may be implemented as hardware or software buttons.

Although not illustrated, one or more hardware buttons may also be included in the computing device architecture 400. The hardware buttons may be used for controlling some operational aspect of the computing device. The hardware buttons may be dedicated buttons or multi-use buttons. The hardware buttons may be mechanical or sensor-based.

The illustrated power components 412 include one or more batteries 452, which can be connected to a battery gauge 454. The batteries 452 may be rechargeable or disposable. Rechargeable battery types include, but are not limited to, lithium polymer, lithium ion, nickel cadmium, and nickel metal hydride. Each of the batteries 452 may be made of one or more cells.

The battery gauge 454 can be configured to measure battery parameters such as current, voltage, and temperature. In some embodiments, the battery gauge 454 is configured to measure the effect of a battery's discharge rate, temperature, age and other factors to predict remaining life within a certain percentage of error. In some embodiments, the battery gauge 454 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 412 may also include a power connector, which may be combined with one or more of the aforementioned I/O components 410. The power components 412 may interface with an external power system or charging equipment via a power I/O component (not illustrated).

Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

It may be appreciated from the foregoing discussion of FIGS. 1-8 that various technical effects may be achieved when implementing enhanced template rendering and page redirection as discussed herein. Combining templates and data to produce HTML with elements and event handlers attached prior to loading the HTML in the browser improves computing performance. Less processing of HTML is required of the browser when elements are already attached to event handlers. Such performance improvements improve the speed of applications and improves the user experience as web pages will be loaded quicker and will be more responsive to user input.

Unbalanced page redirection allows a collaboration site to redirect from multiple desktop pages to a single mobile pages. This means that a one-to-one ratio of desktop to mobile pages is not needed, which reduces the amount of data stored on a collaboration site and the amount of storage space used for the site. In addition, such redirection saves work hours in that a mobile page need not be produced for every desktop page that is produced.

While FIGS. 1-8 generally depict relatively few operational scenarios and sequences, it may be appreciated that the concepts disclosed herein may be applied at scale and routinely. For example, the template rendering engine and processes disclosed herein could be deployed in support of any number of clients and devices.

Certain inventive aspects may be appreciated from the foregoing disclosure, of which the following are various examples.

EXAMPLE 1

A collaboration service comprising: a plurality of collaboration sites that each comprise a plurality web pages, wherein the plurality of web pages comprises desktop pages and mobile pages; and a routing service that redirects mobile requests for the desktop pages to the mobile pages in accordance with a desktop-to-mobile mapping that defines an unbalanced correspondence between the desktop pages and the mobile pages and redirects desktop requests for the mobile pages to the desktop pages in accordance with a mobile-to-desktop mapping that defines a balanced correspondence between the desktop pages and the mobile pages.

EXAMPLE 2

The collaboration service of Example 1 wherein the routing service receives a plurality of requests for the plurality of web pages from a plurality of service clients and discriminates between those that comprise the mobile requests and those that comprise the desktop requests based on an identity of a source of each of the plurality of requests.

EXAMPLE 3

The collaboration service of Examples 1-2 wherein the routing service looks-up the identity of the source in a table that identifies each of the plurality of service clients as a mobile client or a non-mobile client.

EXAMPLE 4

The collaboration service of Examples 1-3 wherein the unbalanced correspondence between the desktop pages and the mobile pages comprises a many-to-one correspondence between a subset of the desktop pages and a one of the mobile pages.

EXAMPLE 5

The collaboration service of Examples 1-4 wherein the balanced correspondence between the desktop pages and the mobile pages comprises a one-to-one correspondence between a different subset of the desktop pages and a subset of the mobile pages.

EXAMPLES 6

The collaboration service of Examples 1-5 wherein the desktop-to-mobile mapping defines the unbalanced correspondence between the desktop pages in terms of list types and view identifiers for list views included in the desktop pages, wherein the mobile-to-desktop mapping defines the balanced correspondence between the desktop pages and the mobile pages in terms of page names.

EXAMPLE 7

A method for redirecting requests for web pages comprising: in response to a request for a web page, wherein the web page comprises a view of a list, identifying a tuple comprised of a list type associated with the list and a view identifier associated with the list; identifying a different web page from among a plurality of web pages based at least in part on which of the plurality of web pages corresponds to the tuple; and identifying the different web page in reply to the request.

EXAMPLE 8

The method of Example 7 further comprising: in response to an additional request for an additional web page, wherein the additional web page comprises the view of the list, identifying an additional tuple comprised of the list type associated with the list and the view identifier associated with the list; identifying the different web page from among the plurality of web pages based at least in part on which of the plurality of web pages corresponds to the additional tuple; and identifying the different web page in reply to the additional request.

EXAMPLE 9

The method of Examples 7-8 wherein the web page comprises a page in a collaboration web site having a desktop format, wherein the additional web page comprises an additional page in the collaboration web site having the desktop format, and wherein the different web page comprises a different page in the collaboration web site having a mobile format.

EXAMPLE 10

The method of Examples 7-9 further comprising: in response to an additional request for an additional web page, wherein the additional web page comprises the view of the list, identifying the different web page from among the plurality of web pages based at least in part on which of the plurality of web pages corresponds to the additional web page; and identifying the different web page in reply to the additional request.

EXAMPLE 11

The method of Examples 7-10 wherein the web page comprises a page in a collaboration web site having a desktop format, wherein the additional web page comprises an additional page in the collaboration web site having a mobile, and wherein the different web page comprises a different page in the collaboration web site having the desktop format.

EXAMPLE 12

The method of Examples 7-11 wherein identifying the tuple occurs in response to determining that the request originated from a mobile client.

EXAMPLE 13

The method of Examples 7-12 wherein a collaboration site includes the plurality of web pages, wherein the plurality of web pages includes a subset of web pages having a desktop format that correspond to a single one of a subset of web pages having a mobile format.

EXAMPLE 14

An apparatus comprising: one or more computer readable storage media; and program instructions stored on the one or more computer readable storage media for redirecting requests for web pages that, when executed by a processing system, direct the processing system to at least: in response to a request for a web page comprised of a view of a list, identify a tuple comprised of a list type associated with the list and a view identifier associated with the list; identify a different web page from among a plurality of web pages based at least in part on which of the plurality of web pages corresponds to the tuple; and identify the different web page in reply to the request.

EXAMPLE 15

The apparatus Example 14 wherein the program instructions, in response to an additional request for an additional web page that comprises the view of the list, direct the processing system to at least: identify an additional tuple comprised of the list type associated with the list and the view identifier associated with the list; identify the different web page from among the plurality of web pages based at least in part on which of the plurality of web pages corresponds to the additional tuple; and identify the different web page in reply to the additional request.

EXAMPLE 16

The apparatus of Examples 14-15 further comprising the processing system configured to execute the program instructions, wherein the web page comprises a page in a collaboration web site having a desktop format, wherein the additional web page comprises an additional page in the collaboration web site having the desktop format, and wherein the different web page comprises a different page in the collaboration web site having a mobile format.

EXAMPLE 17

The apparatus of Examples 14-16 wherein the program instructions, in response to an additional request for an additional web page comprising the view of the list, further direct the processing system to: identify the different web page from among the plurality of web pages based at least in part on which of the plurality of web pages corresponds to the additional web page; and identify the different web page in reply to the additional request.

EXAMPLE 18

The apparatus of Examples 14-17 wherein the web page comprises a page in a collaboration web site having a desktop format, wherein the additional web page comprises an additional page in the collaboration web site having a mobile, and wherein the different web page comprises a different page in the collaboration web site having the desktop format.

EXAMPLE 19

The apparatus of Examples 14-18 wherein program instructions direct the processing system to identify the tuple the request originates from a mobile client.

EXAMPLE 20

The apparatus of Examples 14-19 wherein a collaboration site includes the plurality of web pages, wherein the plurality of web pages includes a subset of web pages having a desktop format that correspond to a single one of a subset of web pages having a mobile format.

EXAMPLE 21

A computer, comprising: a processor; and a computer-readable storage medium in communication with the processor, the computer-readable storage medium comprising computer-executable instructions stored thereupon which, when executed by the processor, cause the processor to provide a template-based client-rendering platform.

EXAMPLE 22

A computer-implemented method, comprising: providing a template-based client-rendering platform.

EXAMPLE 23

A computer-readable storage medium having computer-executable instructions stored thereupon which, when executed by a computer, cause the computer to: provide a template-based client-rendering platform.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and Figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A collaboration service, run by one or more processors, including program instructions stored on one or more computer readable storage devices for redirecting requests for web pages, comprising:
   a plurality of collaboration sites that each comprise a plurality of web pages, wherein the plurality of web pages comprises desktop pages and mobile pages; and
   a routing service that:
      receives a plurality of requests for the plurality of web pages from a plurality of service clients;
      discriminates between those that comprise mobile requests and those that comprise desktop requests based on an identity of a source of each of the plurality of requests;
      redirects the mobile requests for the desktop pages to the mobile pages in accordance with a desktop-to-mobile mapping that defines an unbalanced page redirection between the desktop pages and the mobile pages such that different mobile requests for different desktop pages that include a list view of an underlying list are redirected to a single mobile page that also includes the list view of the underlying list, wherein the desktop pages are defined at least in part by a tuple comprising a list template type associated with the underlying list and a view identifier associated with the underlying list; and
      redirects the desktop requests for the mobile pages to the desktop pages in accordance with a mobile-to-desktop mapping that defines a balanced page redirection between the desktop pages and the mobile pages.

2. The collaboration service of claim 1 wherein the wherein the tuple is the key in the desktop-to-mobile mapping.

3. The collaboration service of claim 2 wherein the routing service looks-up the identity of the source in a table that identifies each of the plurality of service clients as a mobile client or a non-mobile client.

4. The collaboration service of claim 2 wherein the unbalanced page redirection between the desktop pages and the mobile pages comprises a many-to-one page redirection between a subset of the desktop pages and only a one of the mobile pages.

5. The collaboration service of claim 4 wherein the balanced page redirection between the desktop pages and the mobile pages comprises a one-to-one page redirection between a different subset of the desktop pages and a subset of the mobile pages that does not include the one of the mobile pages.

6. The collaboration service of claim 5 wherein the mobile-to-desktop mapping defines the balanced page redirection between the desktop pages and the mobile pages in terms of page names.

7. A method for redirecting requests for web pages comprising:
   receiving a plurality of requests for a plurality of web pages from a plurality of service clients;
   discriminating between those that comprise mobile requests and those that comprise desktop requests based on an identity of a source of each of the plurality of requests;
   redirecting the mobile requests for the desktop pages to the mobile pages in accordance with a desktop-to-mobile mapping that defines an unbalanced page redirection between the desktop pages and the mobile pages such that different mobile requests for different desktop pages that are defined at least in part by a tuple are redirected to a single mobile page that corresponds to the tuple, wherein the tuple comprises a list template type associated with a list and a view identifier associated with the list;
   redirecting the desktop requests for the mobile pages to the desktop pages in accordance with a mobile-to-desktop mapping that defines a balanced page redirection between the desktop pages and the mobile pages; and
   in response to an additional request for an additional web page, wherein the additional web page comprises the list:
      identifying an additional tuple comprised of the list template type associated with the list and the view identifier associated with the list,
      identifying the different web page from among the plurality of web pages based at least in part on which of the plurality of web pages corresponds to the additional tuple, and
      redirecting to the different web page in reply to the additional request.

8. The method of claim 7 wherein the tuple is the key in the desktop-to-mobile mapping.

9. The method of claim 8 wherein the web page comprises a page in a collaboration web site having a desktop format, wherein the additional web page comprises an additional page in the collaboration web site having the desktop format, and wherein the different web page comprises a different page in the collaboration web site having a mobile format.

10. The method of claim 7 further comprising:
    in response to an additional request for an additional web page, wherein the additional web page comprises the view of the list, identifying the different web page from among the plurality of web pages based at least in part on which of the plurality of web pages corresponds to the additional web page; and
    redirecting to the different web page in reply to the additional request.

11. The method of claim 10 wherein the web page comprises a page in a collaboration web site having a desktop format, wherein the additional web page comprises an additional page in the collaboration web site having a mobile, and wherein the different web page comprises a different page in the collaboration web site having the desktop format.

12. The method of claim 7 wherein identifying the tuple occurs in response to determining that the request originated from a mobile client.

13. The method of claim 7 wherein a collaboration site includes the plurality of web pages, wherein the plurality of web pages includes a subset of web pages having a desktop format that correspond to a single one of a subset of web pages having a mobile format.

14. An apparatus comprising:
    one or more computer readable storage devices; and
    program instructions stored on the one or more computer readable storage devices for redirecting requests for web pages that, when executed by a processing system, direct the processing system to at least:
    receive a plurality of requests for a plurality of web pages from a plurality of service clients;
    discriminate between those that comprise mobile requests and those that comprise desktop requests based on an identity of a source of each of the plurality of requests;

redirect the mobile requests for the desktop pages to the mobile pages in accordance with a desktop-to-mobile mapping that defines an unbalanced page redirection between the desktop pages and the mobile pages such that different mobile requests for different desktop pages that are at least in part defined by a tuple are redirected to a single mobile page that corresponds to the tuple, wherein the tuple comprises a list template type associated with a list and a view identifier associated with the list;

redirect the desktop requests for the mobile pages to the desktop pages in accordance with a mobile-to-desktop mapping that defines a balanced page redirection between the desktop pages and the mobile pages; and in response to an additional request for an additional web page, wherein the additional web page comprises the list:
- identify an additional tuple comprised of the list template type associated with the list and the view identifier associated with the list;
- identify the different web page from among the plurality of web pages based at least in part on which of the plurality of web pages corresponds to the additional tuple; and
- redirect to the different web page in reply to the additional request.

15. The apparatus of claim 14 wherein
the tuple is the key in the desktop-to-mobile mapping.

16. The apparatus of claim 15 further comprising the processing system configured to execute the program instructions, wherein the web page comprises a page in a collaboration web site having a desktop format, wherein the additional web page comprises an additional page in the collaboration web site having the desktop format, and wherein the different web page comprises a different page in the collaboration web site having a mobile format.

17. The apparatus of claim 14 wherein the program instructions, in response to an additional request for an additional web page comprising the view of the list, further direct the processing system to:
- identify the different web page from among the plurality of web pages based at least in part on which of the plurality of web pages corresponds to the additional web page; and
- redirect to the different web page in reply to the additional request.

18. The apparatus of claim 17 wherein the web page comprises a page in a collaboration web site having a desktop format, wherein the additional web page comprises an additional page in the collaboration web site having a mobile, and wherein the different web page comprises a different page in the collaboration web site having the desktop format.

19. The apparatus of claim 14 wherein program instructions direct the processing system to identify the tuple the request originates from a mobile client.

20. The apparatus of claim 14 wherein a collaboration site includes the plurality of web pages, wherein the plurality of web pages includes a subset of web pages having a desktop format that correspond to a single one of a subset of web pages having a mobile format.

* * * * *